United States Patent [19]

Kotera et al.

[11] Patent Number: 4,960,861

[45] Date of Patent: Oct. 2, 1990

[54] MULTI LAYER PROCESS FOR PRODUCING ARYLENE SULFIDE POLYMERS

[75] Inventors: Kohichi Kotera, Izumi-ohtsu; Toshinori Sugie, Takaishi; Fumihiro Kobata, Izumi; Juheiji Kawabata; Sugio Hasegawa, both of Sakai, all of Japan

[73] Assignee: Dainippon Ink and Chemicals, Inc., Tokyo, Japan

[21] Appl. No.: 213,436

[22] Filed: Jun. 27, 1988

Related U.S. Application Data

[63] Continuation of Ser. No. 760,093, Jul. 29, 1985, abandoned.

[30] Foreign Application Priority Data

Jul. 31, 1984 [JP] Japan ............................. 59-160936
Sep. 25, 1984 [JP] Japan ............................. 59-198566

[51] Int. Cl.$^5$ ............................................ C08G 75/16
[52] U.S. Cl. ................................... 528/388; 525/537
[58] Field of Search .......................... 528/388; 525/537

[56] References Cited

U.S. PATENT DOCUMENTS

| | | | |
|---|---|---|---|
| 4,038,260 | 7/1977 | Campbell | 528/388 |
| 4,038,262 | 7/1977 | Edmonds | 528/388 |
| 4,038,263 | 7/1977 | Edmonds et al. | 528/388 |
| 4,282,347 | 8/1981 | Tieszen et al. | 528/388 |
| 4,303,781 | 12/1981 | Idel et al. | 528/388 |
| 4,350,810 | 9/1982 | Tieszen et al. | 528/388 |
| 4,373,090 | 2/1983 | Edmonds | 528/388 |
| 4,405,767 | 9/1983 | Beever et al. | 528/388 |

*Primary Examiner*—Harold D. Anderson
*Attorney, Agent, or Firm*—Sherman and Shalloway

[57] ABSTRACT

A process for producing a polyarylene sulfide polymer, which comprises reacting a polyhaloaromatic compound and a sulfidizing agent in a polar amide solvent in the presence of at least one polymerization additive to form a resinuous liquid consisting of a layer (I) containing a major amount of a polymer having a relatively high molecular weight and a minor amount of a polymer having a relatively low molecular weight and a layer (II) containing a major amount of a polymer having a relatively low molecular weight and a minor amount of a polymer having a relatively high molecular weight, and thereafter fractionating the layer (I) or layer (II) from the resinous liquid.

8 Claims, No Drawings

MULTI LAYER PROCESS FOR PRODUCING ARYLENE SULFIDE POLYMERS

This application is a continuation of application Ser. No. 760,093, filed July 29, 1985, now abandoned.

This invention relates to a process for producing arylene sulfide polymers.

The arylene sulfide polymers, a typical example of which is polyphenylene sulfide, are being produced by a process such as disclosed in Japanese Patent Publication No. 3368/1970 (corresponding to U.S. Pat. Nos. 3354129 and 3322834), i.e., by reacting p-dichlorobenzene with sodium sulfide in an organic solvent such as N-methylpyrrolidone followed by removing the solvent from the resulting resinous liquid. The degree of polymerization of the polyphenylene sulfide obtained by this process is however extremely low, and it thus is not suitable for industrial use in its as-obtained state. Hence, the molecular weight of this polyphenylene sulfide is enhanced by heating it in air to oxidize and crosslink it, and the resulting high-molecular-weight polymer is used in practical applications such as injection molding. The extrusion moldability of this polyphenylene sulfide whose molecular weight has been enhanced is however poor, and it is unsuitable for such applications as fibers, films, pipes and sheets.

Process for obtaining arylene sulfide polymers of relatively high-molecular-weight by means of the polymerization reaction are also known. As disclosed in Japanese Laid-Open Patent Application No. 136,100/1978 (corresponding to U.S. Pat. No. 4,116,947), Japanese Laid-Open Patent Application No. 144,495/1976 (corresponding to U.S. Pat. No. 4,038,262), Japanese Laid-Open Patent Application No. 144,497/1976 (corresponding to U.S. Pat. No. 4,038,261) and Japanese Laid-Open Patent Application No. 28,217/1981 (corresponding to U.S. Pat. No. 4,282,347), polymers having a relatively high molecular weight are obtained by carrying out the polymerization reaction in the presence of a polymerization aid.

In most uses there is however a demand for arylene sulfide polymers of relatively high molecular weight having a still narrower range of molecular weight distribution than in the past, especially arylene sulfide polymers free of low-molecular-weight components, and there is already known a patent having this as its object. To wit, there is disclosed in Japanese Patent Publication No. 16,078/1973 (corresponding to U.S. Pat. No. 3,607,843) a method of obtaining polyphenylene sulfide of still higher molecular weight by extracting and recovering the low-molecular-weight polyphenylene sulfide polymer with a suitable solvent and using the recovered polymer in the next polymerization step along with the monomers to be charged. This method has its drawbacks however. First, there is required a solvent extraction step after the polymerization step. Specifically, since the product produced in the polymerization step is a mixture of a low-molecular-weight polymer and a high-molecular-weight polymer, a separate solvent extraction step becomes necessary for this fractionation. Further, since this extraction step is carried out by using N-methylpyrrolidone at a temperature ranging between 135 and 148.9° C. or using benzene at a temperature in the range of 79.4 to 148.9° C. or using toluene at a temperature ranging from 110 to 148.9° C., the polymerization temperature and the extraction temperature differs not only when the extraction solvent and the polymerization solvent are different but also when they are the same. In the second place, as is apparent from the working examples of this application, only arylene sulfide polymers of extremely low-molecular-weight can be fractionated, and since the polymers contained in the remaining resinous liquid are mostly polymers of relatively low molecular weight, it is difficult to obtain polymers of relatively high molecular weight of narrow molecular weight distribution.

An object of this invention is therefore to improve on the drawbacks such as mentioned hereinabove.

Extensive investigations by us led to the discovery that in producing high-molecular-weight arylene sulfide polymers by the polymerization reaction the employment in combination of a specific solvent, a specific polymer-to-solvent ratio, a specific temperature and a specific pressure results in the reaction mixture (resinous liquid) becoming separated into two layers, one a liquid layer containing predominantly a polymer of relatively high molecular weight and the other a liquid layer containing predominantly a polymer of relatively low molecular weight, which layers then can be fractionated.

There is thus provided in accordance with the present invention a process for producing polyarylene sulfide polymers, which comprises reacting a polyhaloaromatic compound and a sulfidizing agent in a polar amide solvent in the presence of at least one polymerization additive to form a resinous liquid consisting of a layer (I) containing a major amount of a polymer having a relatively high molecular weight and a minor amount of a polymer having a relatively low molecular weight (for brevity, to be referred to as "the layer containing a relatively high-molecular-weight polymer") and a layer (II) containing a major amount of a polymer having a relatively low molecular weight and a minor amount of a polymer having a relatively high molecular weight (for brevity, to be referred to as "the layer containing a relatively low-molecular-weight polymer"), and thereafter fractionating the layer (I) and layer (II) from the resinous liquid.

In practicing the present invention, first of all, as a precondition a polymer having a relatively high molecular weight must be formed by a polymerization reaction. For achieving this, for example, a polyhaloaromatic compound and a sulfidizing agent must be subjected to a polymerization reaction in a polar amide solvent at an elevated temperature of at least 200° C. in the presence of a polymerization additive. In this invention the resinous liquid formed is separated into the two layers of (I) a layer containing a polymer of relatively high molecular weight and (II) a layer containing a polymer of relatively low molecular weight by taking into consideration the insolubility of the arylene sulfide polymer at below 200° C., its solubility at above 200° C., especially its temperature dependency, the influence of the polymerization catalyst and polymerization additive on the solubility of the polymer, and the specific gravity of the system.

The polyhaloaromatic compound used in the process of this invention is a halogenated aromatic compound having at least two halogen atoms directly attached to the benzene ring, and preferably one having 6 to 30 carbon atoms. Specific examples are p-dichlorobenzene, m-dichlorobenzene, o-dichlorobenzene, trichlorobenzene, tetrachlorobenzene, dichloronaphthalene, trichloronaphthalene, dibromobenzene, tribromobenzene, dibromonaphthalene, diiodobenzene, triiodobenzene, dichlorodiphenylsulfone, dibromodiphenylsulfone, dichlorobenzophenone, dibromobenzophenone, dichlorodiphenyl ether, dibromodiphenyl ether, dichlorodiphenyl sulfide, dibromodiphenyl sulfide, dichlorobiphenyl and dibromobiphenyl, and mixtures of these compounds. Usually, a dihaloaromatic compound is used, preferred being p-dichlorobenzene. As a means of increasing the viscosity of the polymer by a branched structure, a small amount of a polyhaloaromatic compound having at least three halogen substituents in its molecule may be conjointly used with the dihaloaromatic compound.

As the sulfidizing agent to be used in this invention, conveniently usable is an alkali metal sulfide or a combination of a sulfur source and an alkali metal hydroxide.

The alkali metal sulfides include lithium sulfide, sodium sulfide, potassium sulfide, rubidium sulfide, cesium sulfide, and the mixtures of these compounds. These alkali metal sulfides can be used as a hydrate and/or an aqueous mixture or in their anhydrous form. Further, the addition of a small amount of an alkali metal hydroxide for reacting with the traces of alkali metal bisulfides and alkali metal thiosulfates that are present in the alkali metal sulfides gives rise to no trouble at all. Preferred as the alkali metal sulfides are sodium monosulfide and sodium disulfide.

As the source of sulfur, there can be named, for example, the alkali metal hydrosulfides, hydrogen sulfide, thioamides, thiourea, thiocarbonate, thiocarboxylic acid, carbon disulfide, thiocarboxylate, sulfur and phosphorus pentasulfide. The preferred sulfur source is the alkali metal hydrosulfides. The alkali metal hydrosulfides include lithium hydrosulfide, sodium hydrosulfide, potassium hydrosulfide, rubidium hydrosulfide, cesium hydrosulfide, and the mixtures of these compounds, of which especially preferred is sodium hydrosulfide. These alkali metal hydrosulfides can be used as a hydrate and/or an aqueous mixture or in their anhydrous form. These alkali metal hydrosulfides are used conjointly with an alkali metal hydroxide, but instead of the latter, they may also be used conjointly with sodium N-methyl-4-aminobutyrate or an alkali metal carbonate.

As the alkali metal hydroxide, mention can be made of potassium hydroxide, sodium hydroxide, lithium hydroxide, rubidium hydroxide, cesium hydroxide, and the mixture of these compounds, of which preferred is sodium hydroxide.

In using the alkali metal hydroxide conjointly with the sulfur source, it is suitably used in an amount of 0.8 to 3.0 moles per mole of the latter. Especially, when an alkali metal hydrosulfide is used as the sulfur source, the alkali metal hydroxide is suitably used in an amount ranging from 0.9 to 1.2 moles per mole of the alkali metal hydrosulfide. On the other hand, when the alkali metal hydrosulfide is used in conjunction with sodium N-methyl-4-aminobutyrate, the latter is suitably used in an amount ranging from 0.9 to 1.2 moles per mole of the former.

When the hydrates of the alkali metal sulfides or alkali metal hydrosulfides are used, they must be dehydrated in a solvent before being used in the reaction. In dehydrating the alkali metal hydrosulfide, it is preferred that an alkali metal hydroxide or sodium N-methyl-4-aminobutyrate be copresent.

Examples of the organic polar amide solvents used in the process of this invention are N,N-dimethylformamide, N,N-dimethylacetamide, N-methyl-2-pyrrolidone, N-ethyl-2-pyrrolidone, N-methyl-epsilon-caprolactam, and hexamethylphosphoramide, or the mixtures thereof. Especially preferred of these solvents is N-methyl-2-pyrrolidone (NMP).

A part such as not more than 50% by weight, of these solvents can be substituted by other solvents. As such a cosolvent, suitable is liquid alcohol having at both normal atmospheric and reduced pressure a boiling point of at least 65° C. as well as a boiling point above the melting point of sodium sulfide hydrate. Specific examples include such aliphatic monohydric alcohols as ethanol, n-propanol, isopropanol, n-butanol, cyclohexyl alcohol, ethylene glycol and 1,3-butanediol; and such aromatic alcohols as benzyl alcohol, phenol and o-cresol. Again, the liquid hydrocarbons having at both normal atmospheric and reduced pressure a boiling point of at least 65° C. are also suitable as cosolvents. Specifically, included are, for example, such aromatic hydrocarbons as benzene, toluene, xylene, ethylbenzene, tetralin, diphenyl and triphenyl; such aliphatic hydrocarbons as n-hexane, n-heptane, n-octane and isooctane; and such alicyclic hydrocarbons as cyclohexane and decalin.

The sulfidizing agent is suitably used in an amount of 0.8 to 1.2 equivalents, preferably 0.9 to 1.1 equivalents, of sulfur per equivalent of the halogen of the polyhaloaromatic compound. When a dihaloaromatic compound is used, the amount used of the sulfidizing agent is chosen such that the amount of the sulfur element becomes 0.8 to 1.2 moles, preferably 0.9 to 1.1 moles, per mole of the dihaloaromatic compound.

The polar amide solvent is suitably used in an amount of usually 0.5 to 40 times, preferably 1.5 to 20 times, by weight of the polyhaloaromatic compound. When a dihaloaromatic compound is used, the solvent is used in an amount of 2.5 to 20 moles, preferably 3 to 10 moles, per mole of the dihaloaromatic compound.

As the polymerization additive, included are, for example the metal salts of organic sulfonic acids, lithium halides, metal salts of carboxylic acids and alkali salts of phosphoric acid, of which one or more classes are used.

The metal salts of organic sulfonic acids are compounds having the following general formulas I to IV.

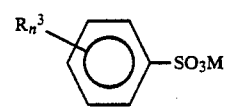   I

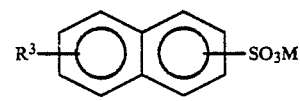   II

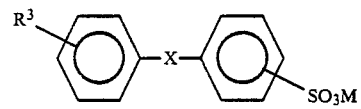   III

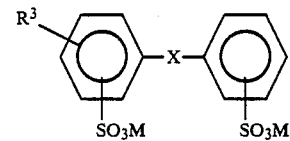   IV wherein $R^3$ is hydrogen or an alkyl group of 1 to 30 carbon atoms, n is an integer from 0 to 2, M is an alkali metal selected from the group consisting of sodium, potassium, rubidium and cesium, and X is a direct bond,

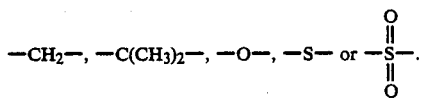

The acid radical component constituting these sulfonic acid metal salts include, for example, benzenesulfonic acid, p-toluenesulfonic acid, 2,4-dimethylbenzenesulfonic acid, 2,5-dimethylbenzenesulfonic acid, p-ethylbenzenesulfonic acid, dodecylbenzenesulfonic acid, alpha-naphthalenesulfonic acid, biphenylsulfonic acid, alkylnaphthalenesulfonic acid, laurylbenzenesulfonic acid and alkyldiphenyletherdisulfonic acid. These sulfonic acid salts can be used in either their anhydrous salt form or hydrated salt form, but it goes without saying that the anhydrous salts are to be preferred in view of the objects of this invention.

The lithium halides are chosen from lithium chloride, lithium bromide, lithium iodide and the mixtures of these halides.

The organic group other than the carboxyl group of the metal salts of carboxylic acids is one containing 1 to 50 carbon atoms and may contain nitrogen, oxygen, halogen, silicon or sulfur. Preferred are the alkyl, cycloalkyl, aryl and alkylaryl groups. On the other hand, the metal atom of the metal salts of organic carboxylic acids is chosen from lithium, sodium, potassium, rubidium, cesium, magnesium, calcium, zinc, strontium, cadmium and barium, of which the alkali metals are especially preferred. As specific examples of the metal salts of organic carboxylic acids, included are lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, dilithium succinate, disodium succinate, dipotassium succinate, dilithium adipate, disodium adipate, dipotassium adipate, dilithium sebacate, disodium sebacate, dipotassium sebacate, dilithium decanedicarboxylate, disodium decanedicarboxylate, dipotassium decanedicarboxylate, dilithium phthalate, disodium phthalate, dipotassium phthalate, dilithium isophthalate, disodium isophthalate, dipotassium isophthalate, dilithium terephthalate, disodium terephthalate, dipotassium terephthalate, trisodium trimellitate, tripotassium trimellitate, tetralithium pyromellitate, tetrasodium pyromellitate, tetrapotassium pyromellitate, dilithium toluenedicarboxylate, disodium toluenedicarboxylate, dipotassium toluenedicarboxylate, dilithium naphthalenedicarboxylate, disodium naphthalenedicarboxylate, dipotassium naphthalenedicarboxylate, magnesium acetate, calcium acetate, calcium benzoate, and other salts of the same class, as well as their mixtures.

The alkali salts of phosphoric acid are compounds having the following general formulas V and VI.

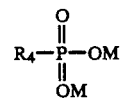

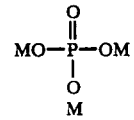

wherein $R_4$ is hydrogen, an alkyl group of 1 to 20 carbon atoms, a cycloalkyl group of 5 to 20 carbon atoms, an aryl group of 6 to 24 carbon atoms, an alkaryl group of 7 to 24 carbon atoms, an aralkyl group of 7 to 24 carbon atoms, an alkenyl group of 2 to 24 carbon atoms, an alkynyl group of 2 to 20 carbon atoms or a cycloalkenyl group of 5 to 20 carbon atoms, and M is an alkali metal, preferably sodium.

Conveniently usable alkali salts of phosphoric acid are trisodium phosphate and the disodium salts of the following acids: methanephosphonic acid, ethane-1-phosphonic acid, propane-1-phosphonic acid, butane-1-phosphonic acid, butane-2-phosphonic acid, pentane-1-phosphonic acid, cyclohexane-1-phosphonic acid, vinyl-1-phosphonic acid, propane-2-phosphonic acid, butene-2-phosphonic acid, indene-2-phosphonic acid, phenylmethanephosphonic acid, (4-methyl-phenyl)-methane-phosphonic acid, beta-naphthylphosphonic acid, 2-phenyl-ethane-1-phosphonic acid, 2,2-diphenylethane-1-phosphonic acid, 4-phenyl-butane-1-phosphonic acid, 2-phenyl-ethylene-1-phosphonic acid, 2,2-diphenylethylene-phosphonic acid, 4-phenyl-butadiene-phosphonic acid, benzenephosphonic acid, 4-methylbenzene-phosphonic acid and 2-phenoxy-ethane-1-phosphonic acid.

At least one of these polymerization additives must be used. Especially preferred is the use of the alkali salts of organic sulfonic acids or salts of organic carboxylic acids. The conjoint use of both of these salts is especially to be desired.

These polymerization additives are preferably used in such an amount as will dissolve in the polar amide solvent at the time of the polymerization reaction. Even though the polymerization additive is used in an amount beyond its limit of solubility, the separation is not promoted and is thus not necessary. While the amount in which the polymerization additive is used will differ specifically in accordance with the classes of reactants used, it is usually used in an amount ranging between 0.01 and 300% by weight, preferably 0.5 to 200% by weight, based on the polyhaloaromatic compound.

The use of such a polymerization additive not only has merely the effect of enhancing the polymerization reaction activity, but also has the following effect. To wit, by changing the solubility of the polymer in the polymerization system, there are formed a layer (I) which contains a relatively high-molecular-weight polymer and a layer (II) which contains a relatively low-molecular-weight polymer. Furthermore, as a result of an increase in the concentration of active ends of the polymer in layer (I), an increase in the reaction rate takes place. Hence, it is believed that as a result of the conjoint action of these two phenomena there is brought about the effect of forming a greater amount of the layer (I), the layer which contains predominantly the relatively high-molecular-weight polymer.

The polymerization reaction temperature is usually 200 to 330° C., preferably 210 to 300° C. The pressure should be in a range that can maintain the polymerization solvent, polymerization additive and the polyhaloaromatic compound, the polymerization monomer, in a substantially liquid phase. A pressure in the range of usually 1.1 to 200 kg/cm$^2$, preferably 1.1 to 30 kg/cm$^2$ is chosen. While the reaction time will vary depending upon the temperature and pressure, it usually is from 10 minutes to about 72 hours, preferably from 1 hour to 48 hours.

The polymerization reaction is preferably carried out in an inert atmosphere such as nitrogen or carbon dioxide. There is no particular restriction as to the sequence in which reaction components are charged, and they may be charged in small increments during the course of the polymerization reaction, or they may be added all at once. Further, carbon dioxide is preferably blown in midway of the polymerization reaction or at the time of the completion of the reaction. This has the effect of preventing the decomposition of the polyarylene sulfide thereby contributing not only to increasing the molecular weight of the resulting polymer but also preventing the decomposition of N-methylpyrrolidone.

For facilitating the separation of the layer (I) which contains a relatively high-molecular-weight polymer and the layer (II) which contains a relatively low-molecular-weight polymer, it is especially preferred that the conditions shown below are chosen.

It is preferred that the polymerization step be controlled such that the resinous liquid formed contains the polar amide solvent and the resulting polymer in a ratio ranging from 20/1 to 1/2 by weight. When this ratio exceeds 20/1, separation into two layers does not take place, and the higher molecular weight and lower molecular weight polymers exist as a single layer. On the other hand, when this ratio is less than 1/2, the polymers of higher molecular weight do not fully dissolve in the solvent. This ratio preferably should be from 20/1 to 1/1.

The temperature at the time of the polymerization reaction preferably ranges between 210° C. and 300° C., and more preferably from 220° C. to 290° C.

While the ratio of the polymerization additive to the polar amide solvent differs depending upon the classes of the solvent and polymerization additive used, usually the ratio is from 2/1 to 1/30 by weight. When this ratio exceeds 2/1, there take place such phenomena as the polymerization additive not dissolving in the solvent, or the polymer component, especially the polymer components of higher molecular weight, not dissolving. On the other hand, when this ratio is less than 1/30, the layer separation effect is inadequate, with the consequence that the polymer components of higher molecular weight and lower molecular weight exist as a single layer.

The pressure at the time of polymerization should preferably be from 1.5 kg/cm$^2$ to 100 kg/cm$^2$, more preferably from 1.5 kg/cm$^2$ to 30 kg/cm$^2$.

For achieving the fractionation and withdrawal of the layer (I) or layer (II), it is necessary that such various conditions as the solvent/polymer ratio, polymerization aid/solvent ratio, temperature and pressure be within a suitable range. These conditions are within the conditions that were held to be convenient in the hereinbefore-described polymerization step. Hence, subsequent to a point where the polymerization reaction has proceeded to a certain degree the fractionation and withdrawal operation can be carried out without subjecting the reaction product to any special treatment whatsoever. Of course, if necessary, the fractionation and withdrawal can be carried out after having subjected the reaction product suitably to a treatment of changing the solvent/polymer ratio by adding a solvent to the system or removing the solent externally of the system by distillation.

There is imposed no particular restriction as to the method of carrying out the fractionation and withdrawal. For example, it is possible to selectively withdraw the layer (I) or layer (II) by means of a sampling tube employing the straw method under an agitation-terminated state or while the layers are being agitated, or the two layers can be selectively and successively fractionated and withdrawn from the bottom of the reaction vessel. However, the production of the arylene sulfide polymers is usually carried out at elevated temperatures and, as required, with the application of pressure, and moreover the withdrawal operation is performed at elevated temperatures. It is thus required to employ a reaction vessel such as an autoclave, which does not permit the inspection of the reaction condition and the state of the resulting resinous liquid from the outside. Therefore, in this invention, as a convenient method for effectively separating the two layers from the resulting resinous liquid, the resinous liquid is divided in two at a level where the difference between the inherent viscosity of the polymer contained in the lower layer and the inherent viscosity of the polymer contained in the upper layer is at least 0.1, preferably at least 0.15, and the lower layer (this usually is the layer that contains predominantly the polymer of relatively high molecular weight) is withdrawn from the bottom of the reaction vessel. For practical purposes, it is industrially advantageous to withdraw a lower layer corresponding to 30 to 70% by weight of the resulting resinous liquid. Needless to say, the upper layer, i.e., the layer higher than the aforesaid level (this usually is the layer that contains predominantly the polymer of relatively low molecular weight) may be withdrawn from the upper part of the reaction vessel. In this case also, for practical purposes, it is industrially advantageous to withdraw an upper layer corresponding to 30 to 70% by weight of the resinous liquid formed.

In separating the layers (I) and (II), sensors that can detect the two layers can also be used. The sensors may be those which can detect the differences in physical properties such as specific gravity, viscosity, dielectric constant, conductivity, refractive index, light transmittance and color. Again, it is also possible to estimate the weights of the two layers in advance and carry out the fractionation and withdrawal by measuring the changes in the weights withdrawn or the amounts remaining.

The polymer can be collected in customary manner from the resinous liquid containing the layer (I), i.e., the layer that contains a polymer of relatively high molecular weight, withdrawn by the process of this invention. For example, the solvent is removed from the resinous liquid by distillation or flashing followed by washing the residue with water or a poor solvent such as acetone or methanol to give a high-molecular-weight polymer containing practically no low-molecular-weight polymer.

On the other hand, when a resinous liquid containing the layer (II), i.e., the layer that contains a polymer of relatively low molecular weight, is withdrawn, a lowmolecular-weight polymer can be produced by operating in the same manner as described above.

When a resinous liquid containing the layer (II), i.e., the layer containing a polymer of relatively low molecular weight, is withdrawn, the molecular weight of the polymer can be increased by carrying out a polymerization reaction after the addition of the aforesaid polyhaloaromatic compound and sulfidizing agent and, as required, the aforementioned polar amide solvent and polymerization additive. In this case, suitably used is a resinous liquid in which the polymer contained therein has an inherent viscosity of preferably 0.05 to 0.20, and more preferably 0.07 to 0.19.

The polyhaloaromatic compound is added in an amount of preferably 20 to 3000 parts by weight, more preferably 50 to 2000 parts by weight based on 100 parts by weight of the polymer contained in the resinous solution. As for the amount of the sulfidizing agent to be added, this may be the same as that previously described in producing the resinous liquid. On the other hand, the amout of the polar amide solvent to be added is preferably decided so that the resin concentration of finally obtained resinous liquid is 2 to 50% by weight. And the polymerization additive is added in such an amount that the ratio by weight of it to the sum total of its weight and the weight of the polar amide solvent remaining in the resinous liquid is preferably 2/1 to 1/30, and more preferably 1/1 to 1/20.

The reaction conditions such as temperature and pressure in carrying out the reaction may be the same as those employed at the time of producing the aforesaid resinous liquid.

By operating in this manner, it becomes possible to obtain a resinous liquid containing at least 50% by weight of a high-molecular-weight polymer having an inherent viscosity of at least 0.24 from a resinous liquid containing predominantly a polymer of low molecular weight having an inherent viscosity of 0.05 to 0.20. Needless to say, this resinous liquid separates in the reaction vessel into two layers, one layer (I) containing a polymer having a relatively high molecular weight (usually the lower layer) and the other a layer (II) containing a polymer having a relatively low molecular weight (usually the upper layer). The layers thus can be fractionated and purified as described hereinbefore.

The high-molecular-weight arylene sulfide polymer obtained by the present invention does not require a crosslinking treatment by heating in air. Hence, it can be used for applications that require a high-molecular-weight polymer such as in extrusion molding or blow molding fibers, sheets, films, pipes and tubes. And it can, of course, also be used for such applications as injection molding and compression molding, which were the principal uses of the conventional product.

The arylene sulfide polymer obtained by this invention can also be conveniently incorporated with fillers, pigments, flame retardants, stabilizers, other polymers, etc. For example, the invention polymer can be incorporated with glass fibers for improving its mechanical strength and heat resistance.

The following examples will serve to illustrate the process of the present invention. The inherent viscosity $[\eta]$ of the arylene sulfide polymer is obtained in the following manner. The relative viscosity of an alpha-chloronaphthalene solution of the polymer of a concentration of 0.4 g/100 ml is measured at 206° C., and the inherent viscosity is calculated as follows:

$$[\eta] = \frac{\ln(\text{relative viscosity})}{\text{Polymer concentration}}$$

The parts and percentages in the example are on a weight basis.

EXAMPLE 1

A 150-liter autoclave having a withdrawal valve at its bottommost part was charged with 43.20 kg (436 moles) of N-methylpyrrolidone, 0.084 kg (2.1 moles) of sodium hydroxide, 8.86 kg (100 moles) of 60% sodium sulfide flakes and 16.29 kg (80 moles) of sodium p-toluenesulfonate. While stirring the charge in an atmosphere of nitrogen, the temperature was slowly raised from 160° C. to 205° C. over the course of 2 hours to remove externally of the system a fraction consisting of 3.6 kg of water and 0.4 kg of N-methylpyrrolidone. Thereafter, 10.02 kg (100 moles) of p-dichlorobenzene, 0.018 kg (0.1 mole) of 1,2,4-trichlorobenzene and 10.80 kg (109 moles) of N-methylpyrrolidone were added. This was followed by carrying out the reaction at 220° C. for 1 hour and then at 260° C. and a pressure of 10 kg/cm² for 3 hours.

When, after allowing the reaction vessel to stand still, a part of the surface portion of the resinous liquid formed was taken and the inherent viscosity of the polymer was measured, it was 0.14. Further, when the resinous liquid was sampled from the bottommost part of the reaction vessel and the inherent viscosity of the polymer was determined in similar manner, it was 0.310.

Next, a withdrawal vessel K1 was set at the bottom of the withdrawal port. Thirty seconds after termination of the stirring, the sectional area of the opening of the withdrwal port was adjusted to 5 square millimeters, and the withdrawal operation was started at 260° C. 10.2% (withdrawal ratio) of the resinous liquid formed was collected in the withdrawal vessel K1. A withdrawal vessel K2 was then set, and the total amount of the resinous liquid remaining was collected in vessel K2. The resinous liquids contained in the vessels K1 and K2 were measured for their polymer contents and inherent viscosities, amounts of polymerization additive, and amounts of solvent. This experiment is designated Run No. 1.

This was followed by carrying out the polymerization reactions as in Run No. 1 and withdrawing the resinous liquids at the withdrawal ratios shown in Table 1 and making the measurements in like manner (Runs Nos. 2–10).

The results obtained in the several runs are shown in Table 1.

As is apparent from Table 1, it was possible to withdraw the high-molecular-weight and low-molecular-weight polymers in separate fractions.

TABLE 1

| Run No. | | | | | | Example 1 | | | | | |
|---|---|---|---|---|---|---|---|---|---|---|---|
| | | 1 | 2 | 3 | 4 | 5 | 6 | 7 | 8 | 9 | 10 |
| Starting | Na$_2$S.2.7H$_2$O | | | | | | 8.86 kg | | | | |
| Materials | NaOH | | | | | | 0.084 kg | | | | |
| | PDCB[1] | | | | | | 10.02 kg | | | | |

TABLE 1-continued

| Run No. | | | Example 1 | | | | | | | | | |
|---|---|---|---|---|---|---|---|---|---|---|---|---|
| | | | 1 | 2 | 3 | 4 | 5 | 6 | 7 | 8 | 9 | 10 |
| | TCB[2] | | | | | | 0.018 kg | | | | | |
| | Polymerization additive[3] | | | | | | 16.29 kg | | | | | |
| | NMP[4] | | | | | | 53.6 kg | | | | | |
| Amount of resinous liquid formed (kg) | | | 78.85 | 78.85 | 78.85 | 78.85 | 78.85 | 78.85 | 78.85 | 78.85 | 78.85 | 78.85 |
| Withdrawal vessel K1 | Amount withdrawn (kg) | | 8.04 | 15.85 | 23.58 | 31.62 | 39.35 | 47.23 | 55.27 | 63.24 | 70.89 | 78.85 |
| (High-molecular- | Withdrawal rate (%) | | 10.2 | 20.1 | 29.9 | 40.1 | 49.9 | 59.9 | 70.1 | 80.2 | 89.9 | 100.0 |
| weight polymer) | Polymer | Weight (kg) | 1.14 | 2.25 | 3.35 | 4.49 | 5.36 | 5.76 | 6.17 | 6.57 | 6.96 | 7.36 |
| | | Rate[5] (%) | 15.5 | 30.6 | 45.5 | 61.1 | 72.8 | 78.2 | 83.8 | 89.2 | 94.5 | 100.0 |
| | | $[\eta]$ | 0.31 | 0.31 | 0.31 | 0.31 | 0.31 | 0.29 | 0.28 | 0.28 | 0.27 | 0.26 |
| | Polymerization | Weight (kg) | 1.93 | 3.80 | 5.65 | 7.58 | 9.27 | 10.67 | 12.10 | 13.52 | 14.87 | 16.29 |
| | | Rate[6] (%) | 11.8 | 23.3 | 34.7 | 46.5 | 56.9 | 65.5 | 74.3 | 83.0 | 91.3 | 100.0 |
| | Solvent | Weight (kg) | 4.81 | 9.48 | 14.10 | 18.91 | 23.92 | 29.85 | 35.89 | 41.87 | 47.62 | 53.60 |
| | | Rate[7] (%) | 9.0 | 17.7 | 26.3 | 35.3 | 44.6 | 55.7 | 67.0 | 78.1 | 88.8 | 100.0 |
| Withdrawal vessel K2 | Amount withdrawn (kg) | | 70.81 | 63.00 | 55.27 | 47.23 | 39.50 | 31.62 | 23.58 | 15.61 | 7.96 | 0.00 |
| (Low-molecular- | Withdrawal rate (%) | | 89.8 | 79.9 | 70.1 | 59.9 | 50.1 | 40.1 | 29.9 | 19.8 | 10.1 | 0.0 |
| weight polymer) | Polymer | Weight (kg) | 6.22 | 5.11 | 4.01 | 2.87 | 2.00 | 1.60 | 1.20 | 0.79 | 0.40 | 0.00 |
| | | Rate[5] (%) | 84.5 | 69.4 | 54.5 | 38.9 | 27.2 | 21.8 | 16.2 | 10.8 | 5.5 | 0.0 |
| | | $[\eta]$ | 0.25 | 0.24 | 0.22 | 0.18 | 0.14 | 0.14 | 0.14 | 0.14 | 0.14 | — |
| | Polymerization | Weight (kg) | 14.36 | 12.49 | 10.64 | 8.71 | 7.02 | 5.62 | 4.19 | 2.77 | 1.42 | 0.00 |
| | additive | Rate[6] (%) | 88.2 | 76.7 | 65.3 | 53.5 | 43.1 | 34.5 | 25.7 | 17.0 | 8.7 | 0.0 |
| | Solvent | Weight (kg) | 48.79 | 44.12 | 39.50 | 34.69 | 29.68 | 23.75 | 17.71 | 11.73 | 5.98 | 0.00 |
| | | Rate[7] (%) | 91.0 | 82.3 | 73.7 | 64.7 | 55.4 | 44.3 | 33.0 | 21.9 | 11.2 | 0.0 |
| K1 + K2 | Total amount of polymer(kg) | | 7.36 | 7.36 | 7.36 | 7.36 | 7.36 | 7.36 | 7.36 | 7.36 | 7.36 | 7.36 |
| | Total amount of solvent(kg) | | 53.60 | 53.60 | 53.60 | 53.60 | 53.60 | 53.60 | 53.60 | 53.60 | 53.60 | 53.60 |

Notes.
[1]P-Dichlorobenzene,
[2]1,2,4-Trichlorobenzene,
[3]Sodium p-toluenesulfonate,
[4]N-methylpyrrolidone,
[5]Rate based on the total amount of polymer (same in the subsequent tables),
[6]Rate based on the total amount of polymerization additive (same in the subsequent tables),
[7]Rate based on total amount of solvent (same in the subsequent tables).
Run No. 10 is shown by way of comparison.

EXAMPLE 2

Run No. 4 of Example 1 was repeated five times. The results thus obtained are shown in Table 2.

As is apparent from Table 2, the reproducibility was satisfactory.

EXAMPLES 3 and 4

The experiment was carried out by operating as in Example 1 but changing the withdrawal temperature and withdrawal rate as shown in Table 3. The results thus obtained are shown in Table 3.

TABLE 2

| Run No. | | | Example 2 | | | | |
|---|---|---|---|---|---|---|---|
| | | | 11 | 12 | 13 | 14 | 15 |
| Starting | $Na_2S \cdot 2.7H_2O$ | | | | 8.86 kg | | |
| materials | NaOH | | | | 0.084 kg | | |
| (kg) | PDCB | | | | 10.02 kg | | |
| | TCB | | | | 0.018 kg | | |
| | Polymerization additive | | | | 16.29 kg | | |
| | NMP | | | | 53.6 kg | | |
| Amount of resinous liquid formed (kg) | | | 78.83 | 78.83 | 78.83 | 78.83 | 78.83 |
| Withdrawal vessel K1 | Amount withdrawn (kg) | | 31.45 | 31.77 | 31.61 | 31.37 | 31.69 |
| (High-molecular- | Withdrawal rate (%) | | 39.9 | 40.3 | 40.1 | 39.8 | 40.2 |
| weight polymer) | Polymer | Weight (kg) | 4.47 | 4.52 | 4.50 | 4.46 | 4.51 |
| | | Rate (%) | 60.8 | 61.4 | 61.1 | 60.6 | 61.2 |
| | | $[\eta]$ | 0.31 | 0.31 | 0.31 | 0.31 | 0.31 |
| | Polymerization | Weight (kg) | 7.53 | 7.60 | 7.57 | 7.51 | 7.59 |
| | aid | Rate (%) | 46.2 | 46.7 | 46.4 | 46.1 | 46.6 |
| | Solvent | Weight (kg) | 18.82 | 19.01 | 18.92 | 18.77 | 18.96 |
| | | Rate (%) | 35.1 | 35.5 | 35.3 | 35.0 | 35.4 |
| Withdrawal vessel K2 | Amount withdrawn (kg) | | 47.37 | 47.06 | 47.22 | 47.46 | 47.14 |
| (Low-molecular- | Withdrawal rate (%) | | 60.1 | 59.7 | 59.9 | 60.2 | 59.8 |
| weight polymer) | Polymer | Weight (kg) | 2.89 | 2.84 | 2.87 | 2.90 | 2.85 |
| | | Rate % | 39.2 | 38.6 | 38.9 | 39.4 | 38.8 |
| | | $[\eta]$ | 0.18 | 0.18 | 0.18 | 0.18 | 0.18 |
| | Polymerization | Weight (kg) | 8.76 | 8.69 | 8.72 | 8.78 | 8.70 |
| | additive | Rate (%) | 53.8 | 53.3 | 53.6 | 53.9 | 53.4 |
| | Solvent | Weight (kg) | 34.78 | 34.59 | 34.68 | 34.83 | 34.69 |
| | | Rate (%) | 64.9 | 64.5 | 64.7 | 65.0 | 64.6 |
| K1 + K2 | Total amount of polymer(kg) | | 7.36 | 7.36 | 7.36 | 7.36 | 7.36 |
| | Total amount of solvent(kg) | | 53.60 | 53.60 | 53.60 | 53.60 | 53.60 |

TABLE 3

| Run No. | | | Example 3 | | | | | | Example 4 | | | | |
|---|---|---|---|---|---|---|---|---|---|---|---|---|---|
| | | | 16 | 17 | 18 | 19 | 20 | 21 | 22 | 23 | 24 | 25 | 26 |
| Withdrawal temperature (°C.) | | | 239 | | | | | | 280 | | | | |
| Amount of resinous liquid formed (kg) | | | 78.84 | 78.84 | 78.84 | 78.84 | 78.84 | 78.84 | 78.83 | 78.83 | 78.83 | 78.83 | 78.83 |
| Withdrawal vessel K1 (High-molecular-weight polymer) | Amount withdrawn (kg) | | 23.65 | 31.42 | 35.55 | 39.50 | 43.36 | 47.23 | 31.61 | 35.39 | 39.42 | 43.44 | 47.14 |
| | Withdrawal rate (%) | | 30.0 | 39.9 | 45.1 | 50.1 | 55.0 | 59.9 | 40.1 | 44.9 | 50.0 | 55.1 | 59.8 |
| | Polymer | Weight (kg) | 3.61 | 4.80 | 5.42 | 5.93 | 6.07 | 6.21 | 4.64 | 5.10 | 5.31 | 5.52 | 5.71 |
| | | Rate (%) | 49.0 | 65.2 | 73.7 | 80.5 | 82.4 | 84.4 | 63.1 | 69.3 | 72.2 | 75.0 | 77.6 |
| | | [$\eta$] | 0.29 | 0.29 | 0.29 | 0.29 | 0.29 | 0.28 | 0.32 | 0.32 | 0.31 | 0.30 | 0.30 |
| | Polymerization additive | Weight (kg) | 5.38 | 7.16 | 8.09 | 8.95 | 9.67 | 10.39 | 7.90 | 8.77 | 9.47 | 10.16 | 10.81 |
| | | Rate (%) | 33.0 | 43.9 | 49.7 | 55.0 | 59.4 | 63.8 | 48.5 | 53.9 | 58.1 | 62.4 | 66.3 |
| | Solvent | Weight (kg) | 14.19 | 18.87 | 21.33 | 23.82 | 26.75 | 29.67 | 18.43 | 20.81 | 23.85 | 26.88 | 29.68 |
| | | Rate (%) | 26.5 | 35.2 | 39.8 | 44.4 | 49.9 | 55.4 | 34.4 | 38.8 | 44.5 | 50.2 | 55.4 |
| Withdrawal vessel K2 (Low-molecular-weight polymer) | Amount withdrawn (kg) | | 55.19 | 47.38 | 43.28 | 39.34 | 35.48 | 31.62 | 47.22 | 43.44 | 39.42 | 35.39 | 31.69 |
| | Withdrawal rate (%) | | 70.0 | 60.1 | 54.9 | 49.9 | 45.0 | 40.1 | 59.9 | 55.1 | 50.0 | 44.9 | 40.2 |
| | Polymer | Weight (kg) | 3.76 | 2.56 | 1.94 | 1.43 | 1.29 | 1.15 | 2.72 | 2.26 | 2.05 | 1.84 | 1.65 |
| | | Rate (%) | 51.0 | 34.8 | 26.3 | 19.5 | 17.6 | 15.6 | 36.9 | 30.7 | 27.8 | 25.0 | 22.4 |
| | | [$\eta$] | 0.23 | 0.20 | 0.17 | 0.13 | 0.13 | 0.13 | 0.17 | 0.14 | 0.14 | 0.14 | 0.14 |
| | Polymerization additive | Weight (kg) | 10.91 | 9.13 | 8.20 | 7.34 | 6.62 | 5.90 | 8.39 | 7.52 | 6.82 | 6.13 | 5.48 |
| | | Rate (%) | 67.0 | 56.1 | 50.3 | 45.0 | 40.6 | 36.2 | 51.5 | 46.1 | 41.9 | 37.6 | 33.7 |
| | Solvent | Weight (kg) | 39.41 | 34.73 | 32.27 | 29.78 | 26.85 | 23.93 | 35.17 | 32.79 | 29.75 | 26.72 | 23.92 |
| | | Rate (%) | 73.5 | 64.8 | 60.2 | 55.6 | 50.1 | 44.6 | 65.6 | 61.2 | 55.5 | 49.8 | 44.6 |
| K1 + K2 | Total amount of polymer(kg) | | 7.36 | 7.36 | 7.36 | 7.36 | 7.36 | 7.36 | 7.36 | 7.36 | 7.36 | 7.36 | 7.36 |
| | Total amount solvent(kg) | | 53.60 | 53.60 | 53.60 | 53.60 | 53.60 | 53.60 | 53.60 | 53.60 | 53.60 | 53.60 | 53.60 |

EXAMPLES 5-7

A 1.5-liter autoclave having a withdrawal port at its bottommost part was charged with 1728 g (17.5 moles) of N-methylpyrrolidone, 3.4 g (0.08 mole) of sodium hydroxide, 520 g (4.0 moles) of 60% sodium sulfide flakes and 576 g (4.0 moles) of sodium benzoate. While stirring the charge in an atmosphere of nitrogen, the temperature was slowly raised from 160° C. to 205° C. during the course of 2 hours to eliminate externally of the system a fraction consisting of 130 g of water and 18 g of N-methylpyrrolidone. Thereafter, 588 g (4.0 moles) of p-dichlorobenzene, 0.72 g (0.004 mole) of 1,2,4-trichlorobenzene and 432 g (4.4 moles) of N-methylpyrrolidone were added, following which the reaction was carried out at 220° C. for 1 hour and then at 260° C. and a pressure of 8.0 kg/cm$^2$ for 3 hours.

After completion of the reaction, the solvent/polymer ratio by weight was changed as shown in Table 4 either by adding the solvent or removing a part of the solvent by distillation, after which the resinous liquid was withdrawn at the withdrawal rate shown in Table 4. The results thus obtained are shown in Table 4.

EXAMPLE 8

The reaction and the fractionation and withdrawal were carried out under identical conditions as in Example 6, except that 410 g (5 moles) of anhydrous sodium acetate was used instead of sodium benzoate. The withdrawal rate was decided by investigating in advance the point at which the separation efficiency would be the best. The results of this experiment are shown together in Table 4.

TABLE 4

| | | | Example 5 | Example 6 | Example 7 | Example 8 |
|---|---|---|---|---|---|---|
| Run No. | | | 27 | 28 | 29 | 30 |
| Solvent/polymer ratio (wt) | | | 15/1 | 8/1 | 3/1 | 8/1 |
| Amount of resinous liquid formed (g) | | | 7390 | 4441 | 2331 | 4272 |
| Withdrawal vessel K1 (High-molecular-Weight polymer) | Amount withdrawn (g) | | 2684 | 1635 | 950 | 1612 |
| | Withdrawal rate (%) | | 36.3 | 36.8 | 40.7 | 37.7 |
| | Polymer | Weight (g) | 329 | 304 | 271 | 308 |
| | | Rate (%) | 78.1 | 72.8 | 65.2 | 73.8 |
| | | [$\eta$] | 0.33 | 0.33 | 0.34 | 0.31 |
| | Polymerization additive | Weight (g) | 305 | 293 | 281 | 197 |
| | | Rate (%) | 52.9 | 50.9 | 48.8 | 48.0 |
| | Solvent | Weight (g) | 2020 | 1008 | 365 | 1077 |
| | | Rate (%) | 32.0 | 29.9 | 28.9 | 32.0 |
| Withdrawal vessel K2 (Low-molecular-weight polymer) | Amount withdrawn (g) | | 4706 | 2806 | 1381 | 2660 |
| | Withdrawal rate (%) | | 63.7 | 63.2 | 59.3 | 62.3 |
| | Polymer | Weight (g) | 92 | 114 | 145 | 109 |
| | | Rate (%) | 21.9 | 27.2 | 34.8 | 26.2 |
| | | [$\eta$] | 0.16 | 0.13 | 0.10 | 0.12 |
| | Polymerization additive | Weight (g) | 271 | 283 | 295 | 213 |
| | | Rate (%) | 47.1 | 49.1 | 51.2 | 52.0 |
| | Solvent | Weight (g) | 4295 | 2360 | 898 | 2291 |
| | | Rate (%) | 68.0 | 70.1 | 71.1 | 68.0 |
| K1 + K2 | Total amount of polymer(g) | | 421 | 418 | 416 | 417 |
| | Total amount of solvent(g) | | 6315 | 3368 | 1263 | 3368 |

EXAMPLE 9

A 25-liter autoclave having a withdrawal port at its bottommost part was charged with 3,456 g (25 moles) of N-methylpyrrolidone, 6.8 g (0.16 mole) of sodium hydroxide, 1040 g (8 moles) of 60% sodium sulfide flakes, and the polymerization aids shown in Table 5. While stirring the charge in an atmosphere of nitrogen, the temperature was slowly raised from 160° C. to 205° C.

over the course of 2 hours to distill off externally of the system a fraction consisting of water and N-methylpyrrolidone. The composition of the fraction is shown in Table 5. Thereafter, 1,176 g (8 moles) of p-dichlorobenzene, 1.44 g (0.008 mole) of 1,2,4-trichlorobenzene and 864 g (8.8 moles) of N-methylpyrrolidone were added. This was followed by carrying out the reaction at 220° C. for 1 hour and then at 260° C. and a pressure of 8.2 kg/cm² for 3 hours.

After completion of the reaction, 2,592 g of the solvent N-pyrrolidone was added, and the fractionation and withdrawal operation was carried out at a withdrawal rate shown in Table 5. The results thus obtained are shown in Table 5.

TABLE 5

| Run No. | | | Example 9 | | | | |
|---|---|---|---|---|---|---|---|
| | | | 31 | 32 | 33 | 34 | 35 |
| Amount of polymerization additive | Sodium benzoate | (g) | 0 | 288 | 576 | 864 | 1152 |
| | | (mol) | (0) | (2) | (4) | (6) | (8) |
| | Sodium p-toluene-sulfonate | (g) | 1680 | 1260 | 840 | 420 | 0 |
| | | (mol) | (8) | (6) | (4) | (2) | (0) |
| Fraction composition | Water (g) | | 264 | 262 | 264 | 260 | 261 |
| | N-methylpyrrolidone (g) | | 17 | 18 | 16 | 18 | 17 |
| Withdrawal temperature (°C.) | | | 260 | 260 | 260 | 260 | 260 |
| Amount of resinous liquid formed (g) | | | 9574 | 9443 | 9311 | 9181 | 9049 |
| Withdrawal vessel K1 (High-molecular-weight polymer) | Amount withdrawn (g) | | 3601 | 3297 | 3271 | 3389 | 4118 |
| | Withdrawal rate (%) | | 37.6 | 34.9 | 35.1 | 36.9 | 45.5 |
| | Polymer | Weight (g) | 618 | 686 | 726 | 677 | 601 |
| | | Rate (%) | 72.9 | 81.0 | 85.8 | 80.0 | 70.9 |
| | | $[\eta]$ | 0.34 | 0.38 | 0.39 | 0.37 | 0.33 |
| | Polymerization additive | Weight (g) | 857 | 557 | 424 | 449 | 622 |
| | | Rate (%) | 51.0 | 36.0 | 29.9 | 34.9 | 54.0 |
| | Solvent | Weight (g) | 2068 | 1999 | 2064 | 2204 | 2825 |
| | | Rate (%) | 30.0 | 29.0 | 29.9 | 32.0 | 41.0 |
| Withdrawal vessel K2 (Low-molecular-weight polymer) | Amount withdrawn (g) | | 5973 | 6146 | 6044 | 5792 | 4931 |
| | Withdrawal rate (%) | | 62.4 | 65.1 | 64.9 | 63.1 | 54.5 |
| | Polymer | Weight (g) | 229 | 161 | 121 | 170 | 246 |
| | | Rate (%) | 27.1 | 19.0 | 14.2 | 20.0 | 29.1 |
| | | $[\eta]$ | 0.13 | 0.13 | 0.14 | 0.14 | 0.14 |
| | Polymerization additive | Weight (g) | 823 | 991 | 992 | 835 | 530 |
| | | Rate (%) | 49.0 | 64.0 | 70.1 | 65.1 | 46.1 |
| | Solvent | Weight (g) | 4827 | 4895 | 4832 | 4690 | 4070 |
| | | Rate (%) | 70.0 | 71.0 | 70.1 | 68.0 | 59.0 |
| K1 + K2 | Total amount of polymer (g) | | 847 | 847 | 847 | 847 | 847 |
| | Total amount of solvent (g) | | 6895 | 6894 | 6896 | 6894 | 6895 |

EXAMPLE 10

Run No. 33 of Example 9 was repeated but changing the amounts of the polymerization aids as shown in Table 6. The results obtained are shown in Table 6.

TABLE 6

| Run No. | | | Example 10 | | |
|---|---|---|---|---|---|
| | | | 36 | 37 | 38 |
| Polymerization additive | Sodium benzoate | | 1440 g | 576 g | 115 g |
| | Sodium p-sulfonate | | 1100 g | 840 g | 168 g |
| Polymerization additive/solvent ratio (wt) | | | 0.51 | 0.20 | 0.04 |
| Withdrawal temperature (°C.) | | | 260 | 260 | 260 |
| Amount of resinous liquid formed (g) | | | 11446 | 9310 | 8163 |
| Withdrawal vessel K1 (High-molecular-weight polymer) | Amount withdrawn (g) | | 3790 | 3269 | 3054 |
| | Withdrawal rate (%) | | 33.1 | 35.1 | 37.4 |
| | Polymer | Weight (g) | 745 | 726 | 701 |
| | | Rate (%) | 87.9 | 85.9 | 82.9 |
| | | $[\eta]$ | 0.33 | 0.39 | 0.30 |
| | Polymerization additive | Weight (g) | 990 | 424 | 96 |
| | | Rate (%) | 28.0 | 29.9 | 33.9 |
| | Solvent | Weight (g) | 1999 | 2064 | 2204 |
| | | Rate (%) | 29.0 | 29.9 | 32.0 |
| Withdrawal vessel K2 (Low-molecular-weight polymer) | Amount withdrawn (g) | | 7656 | 6041 | 5109 |
| | Withdrawal rate (%) | | 66.9 | 64.9 | 62.6 |
| | Polymer | Weight (g) | 102 | 120 | 145 |
| | | Rate (%) | 12.1 | 14.1 | 17.1 |
| | | $[\eta]$ | 0.13 | 0.13 | 0.11 |
| | Polymerization additive | Weight (g) | 2550 | 992 | 187 |
| | | Rate (%) | 72.0 | 70.1 | 66.1 |
| | Solvent | Weight (g) | 4895 | 4832 | 4691 |
| | | Rate (%) | 71.0 | 70.1 | 68.0 |
| K1 + K2 | Total amount of polymer (g) | | 847 | 846 | 846 |
| | Total amount of solvent (g) | | 6894 | 6896 | 6894 |

EXAMPLE 11

Run No. 36 of Example 10 was repeated but changing the class and amount used of the polymerization aid and the amount of resinous liquid withdrawn as shown in Table 7. The results obtained are shown in Table 7.

rated into two layers. The withdrawal temperature was 260° C.

TABLE 7

|  |  |  | Example 11 | | |
|---|---|---|---|---|---|
|  |  | Run No. | 39 | 40 | 41 |
| Kind of polymerization additive |  |  | Lithium acetate | Lithium chloride | Trisodium phosphate |
| Amount used of polymerization additive |  |  | 419 (g) | 527 (g) | 1230 (g) |
| Amount of resinous liquid formed (g) |  |  | 8768 | 8416 | 9330 |
| Withdrawal vessed K1 (High-molecular-weight polymer) | Amount withdrawn (g) |  | 5446 | 4798 | 6345 |
|  | Withdrawal rate (%) |  | 62.1 | 57.0 | 68.0 |
|  | Polymer | Weight (g) | 617 | 643 | 847 |
|  |  | Rate (%) | 73.0 | 76.0 | 82.6 |
|  |  | [η] | 0.29 | 0.30 | 0.29 |
|  | Polymerization additive | Weight (g) | 526 | 211 | 480 |
|  |  | Rate (%) | 60.9 | 40.0 | 39.0 |
|  | Solvent | Weight (g) | 4201 | 3859 | 4895 |
|  |  | Rate (%) | 60.9 | 56.0 | 71.0 |
| Withdrawal vessed K2 (Low-molecular-weight polymer) | Amount withdrawn (g) |  | 3322 | 3618 | 2986 |
|  | Withdrawal rate (%) |  | 37.9 | 43.0 | 32.0 |
|  | Polymer | Weight (g) | 229 | 204 | 178 |
|  |  | Rate (%) | 27.0 | 24.0 | 17.4 |
|  |  | [η] | 0.13 | 0.11 | 0.11 |
|  | Polymerization additive | Weight (g) | 338 | 316 | 751 |
|  |  | Rate (%) | 39.1 | 60.0 | 61.0 |
|  | Solvent | Weight (g) | 2696 | 3036 | 2000 |
|  |  | Rate (%) | 39.1 | 44.0 | 29.0 |
| K1 + K2 | Total amount of polymer (g) |  | 846 | 847 | 1025 |
|  | Total amount of solvent (g) |  | 6897 | 6895 | 6895 |

TABLE 8

|  |  |  | Comparative Example | | | |
|---|---|---|---|---|---|---|
| Run No. |  |  | 42 | 43 | 44 | 45 |
| Amount of resinous liquid formed (kg) |  |  | 62.56 | 62.56 | 62.56 | 62.56 |
| Withdrawal vessel K1 (High-molecular-weight polymer) | Amount withdrawn (kg) |  | 12.57 | 25.59 | 37.66 | 50.11 |
|  | Withdrawal rate (%) |  | 20.1 | 40.9 | 60.2 | 80.1 |
|  | Polymer | Weight (kg) | 2.35 | 4.79 | 5.83 | 6.59 |
|  |  | Rate (%) | 32.0 | 65.1 | 79.2 | 89.6 |
|  |  | [η] | 0.13 | 0.13 | 0.13 | 0.13 |
|  | Polymerization additive | Weight (kg) | 0.00 | 0.00 | 0.00 | 0.00 |
|  |  | Rate (%) | 15.0 | 30.5 | 52.1 | 76.0 |
|  | Solvent | Weight (kg) | 9.90 | 20.14 | 30.87 | 42.24 |
|  |  | Rate (%) | 18.5 | 37.6 | 57.6 | 78.8 |
| Withdrawal vessel K2 (Low-molecular-weight polymer) | Amount withdrawn (kg) |  | 49.99 | 36.97 | 24.90 | 12.45 |
|  | Withdrawal rate (%) |  | 79.9 | 59.1 | 39.8 | 19.9 |
|  | Polymer | Weight (kg) | 5.01 | 2.57 | 1.53 | 0.77 |
|  |  | Rate (%) | 68.0 | 34.9 | 20.8 | 10.4 |
|  |  | [η] | 0.13 | 0.13 | 0.13 | 0.13 |
|  | Polymerization additive | Weight (kg) | 0.00 | 0.00 | 0.00 | 0.00 |
|  |  | Rate (%) | 85.0 | 69.5 | 47.9 | 24.0 |
|  | Solvent | Weight (kg) | 43.70 | 33.42 | 22.73 | 11.36 |
|  |  | Rate (%) | 81.5 | 62.4 | 42.4 | 21.2 |
| K1 + K2 | Total amount of polymer(kg) |  | 7.36 | 7.36 | 7.36 | 7.36 |
|  | Total amount of solvent(kg) |  | 53.60 | 53.60 | 53.60 | 53.60 |

COMPARATIVE EXAMPLE

Run No. 1 of Example 1 was repeated but without using the polymerization additive. When the resulting resinous liquids were withdrawn at the rates shown in Table 8, the inherent viscosity of the polymer withdrawn and that of the polymer remaining in the reaction vessel were practically the same. That is to say, in this experiment the resinous liquids formed were not separated into two layers. The withdrawal temperature was 260° C.

EXAMPLE 12

In each run the starting materials shown in Table 9 were added severally to the low-molecular-weight polymers obtained in Runs Nos. 4 to 7 of Example 1, which were contained in the withdrawal vessel K2. Thereafter, the reaction was carried out as in Example 1, following which the high-molecular-weight polymer and the low-molecular-weight polymer were taken out into the withdrawal vessels K1 and K2, respectively, at the rates shown in Table 9.

TABLE 9

|  |  | | Example 12 | | | |
|---|---|---|---|---|---|---|
|  |  | Run No. | 46 | 47 | 48 | 49 |
| Starting materials (kg) | Na$_2$S.2.7H$_2$O | | 5.41 | 6.45 | 6.92 | 7.42 |
|  | NaOH | | 0.051 | 0.061 | 0.066 | 0.070 |
|  | PDCB | | 6.12 | 7.29 | 7.84 | 6.56 |
|  | TCB | | 0.011 | 0.013 | 0.014 | 0.015 |
|  | Polymerization additive | | 7.58 | 9.27 | 10.67 | 12.10 |

TABLE 9-continued

|  |  |  | Example 12 | | | |
|---|---|---|---|---|---|---|
|  |  | Run No. | 46 | 47 | 48 | 49 |
|  | NMP |  | 18.31 | 23.92 | 29.85 | 35.89 |
| Amount of resinous liquid formed (kg) |  |  | 78.86 | 78.86 | 78.87 | 78.87 |
| Withdrawal vessel K1 | Amount withdrawn (kg) |  | 31.62 | 39.51 | 47.40 | 54.31 |
| (High-molecular- | Withdrawal rate (%) |  | 40.1 | 50.1 | 60.1 | 67.4 |
| weight polymer) | Polymer | Weight (kg) | 6.09 | 6.46 | 6.48 | 6.39 |
|  |  | Rate (%) | 82.7 | 87.7 | 88.0 | 86.8 |
|  |  | [η] | 0.37 | 0.36 | 0.35 | 0.34 |
|  | Polymerization | Weight (kg) | 7.30 | 8.93 | 10.46 | 11.80 |
|  | additive | Rate (%) | 44.8 | 54.8 | 64.2 | 72.4 |
|  | Solvent | Weight (kg) | 17.59 | 23.31 | 29.49 | 35.00 |
|  |  | Rate (%) | 32.8 | 43.5 | 55.0 | 65.3 |
| Withdrawal vessel K2 | Amount withdrawn (kg) |  | 47.24 | 39.35 | 31.47 | 24.06 |
| (Low-molecular- | Withdrawal rate (%) |  | 59.9 | 49.9 | 39.9 | 30.5 |
| weight polymer) | Polymer | Weight (kg) | 1.27 | 0.90 | 0.88 | 0.97 |
|  |  | Rate (%) | 17.3 | 12.3 | 12.0 | 13.2 |
|  |  | [η] | 0.23 | 0.15 | 0.14 | 0.14 |
|  | Polymerization | Weight (kg) | 8.99 | 7.36 | 5.83 | 4.49 |
|  | additive | Rate (%) | 55.2 | 45.2 | 35.8 | 27.6 |
|  | Solvent | Weight (kg) | 36.01 | 30.29 | 24.11 | 18.60 |
|  |  | Rate (%) | 67.2 | 56.5 | 45.0 | 34.7 |
| K1 + K2 | Total amount of polymer (kg) |  | 7.36 | 7.36 | 7.36 | 7.36 |
|  | Total amount of solvent (kg) |  | 53.6 | 53.6 | 53.6 | 53.6 |

As can be seen from Table 9, the fractionation and withdrawal of a high-molecular-weight polymer is possible, and its molecular weight is high. Moreover, its rate of formation is also high.

EXAMPLE 13

Example 1 was repeated but changing the withdrawal temperature and withdrawal rate as shown in Table 10. The results thus obtained are shown in Table 10.

EXAMPLE 14

In each of the runs, the starting materials shown in Table 11 were added severally to the low-molecular-weight polymers obtained in the several runs of Example 13, which were contained in the withdrawal vessel K2. Thereafter, the reaction was carried out as in Example 13, and a high-molecular-weight polymer and a low-molecular-weight polymer were taken out into the withdrawal vessels K1 and K2, respectively, at the withdrawal rates shown in Table 11. The results thus obtained are shown in Table 11.

TABLE 10

|  |  |  | Example 13 | | | | | | | |
|---|---|---|---|---|---|---|---|---|---|---|
|  |  | Run No. | 50 | 51 | 52 | 53 | 54 | 55 | 56 | 57 |
| Withdrawal temperature (°C.) |  |  | 239 | | | | 280 | | | |
| Amount of resinous liquid formed (kg) |  |  | 78.84 | 78.84 | 78.84 | 78.84 | 78.83 | 78.83 | 78.83 | 78.83 |
| Withdrawal vessel K1 | Amount withdrawn (kg) |  | 35.55 | 39.50 | 43.36 | 47.23 | 35.39 | 39.42 | 43.44 | 47.14 |
| (High-molecular- | Withdrawal rate (%) |  | 45.1 | 50.1 | 55.0 | 59.9 | 44.9 | 50.0 | 55.1 | 59.8 |
| weight polymer) | Polymer | Weight (kg) | 5.42 | 5.93 | 6.07 | 6.21 | 5.10 | 5.31 | 5.52 | 5.71 |
|  |  | Rate (%) | 73.7 | 80.5 | 82.4 | 84.4 | 69.3 | 72.2 | 75.0 | 77.6 |
|  |  | [η] | 0.29 | 0.29 | 0.29 | 0.28 | 0.32 | 0.31 | 0.30 | 0.30 |
|  | Polymerization | Weight (kg) | 8.09 | 8.95 | 9.67 | 10.39 | 8.77 | 9.47 | 10.16 | 10.81 |
|  | additive | Rate (%) | 49.7 | 55.0 | 59.4 | 63.8 | 53.9 | 58.1 | 62.4 | 66.3 |
|  | Solvent | Weight (kg) | 21.33 | 23.82 | 26.75 | 29.67 | 20.81 | 23.85 | 26.88 | 29.68 |
|  |  | Rate (%) | 39.8 | 44.4 | 49.9 | 55.4 | 38.8 | 44.5 | 50.2 | 55.4 |
| Withdrawal vessel K2 | Amount withdrawn (kg) |  | 43.28 | 39.34 | 35.48 | 31.62 | 43.44 | 39.42 | 35.39 | 31.69 |
| (Low-molecular- | Withdrawal rate (%) |  | 54.9 | 49.9 | 45.0 | 40.1 | 55.1 | 50.0 | 44.9 | 40.2 |
| weight polymer) | Polymer | Weight (kg) | 1.94 | 1.43 | 1.29 | 1.15 | 2.26 | 2.05 | 1.84 | 1.65 |
|  |  | Rate (%) | 26.3 | 19.5 | 17.6 | 15.6 | 30.7 | 27.8 | 25.0 | 22.4 |
|  |  | [η] | 0.17 | 0.13 | 0.13 | 0.13 | 0.14 | 0.14 | 0.14 | 0.14 |
|  | Polymerization | Weight (kg) | 8.20 | 7.34 | 6.62 | 5.90 | 7.52 | 6.82 | 6.13 | 5.48 |
|  | additive | Rate (%) | 50.3 | 45.0 | 40.6 | 36.2 | 46.1 | 41.9 | 37.6 | 33.7 |
|  | Solvent | Weight (kg) | 32.27 | 29.78 | 26.85 | 23.93 | 32.79 | 29.75 | 26.72 | 23.92 |
|  |  | Rate (%) | 60.2 | 55.6 | 50.1 | 44.6 | 61.2 | 55.5 | 49.8 | 44.6 |
| K1 + K2 | Total amount of polymer (kg) |  | 7.36 | 7.36 | 7.36 | 7.36 | 7.36 | 7.36 | 7.36 | 7.36 |
|  | Total amount of solvent (kg) |  | 53.60 | 53.60 | 53.60 | 53.60 | 53.60 | 53.60 | 53.60 | 53.60 |

TABLE 11

|  |  |  | Example 14 | | | |
|---|---|---|---|---|---|---|
|  |  | Run No. | 58 | 59 | 60 | 61 |
|  | Withdrawal temperature (°C.) |  | 239 | | | |
| Starting | $Na_2S \cdot 2.7H_2O$ |  | 6.53 | 7.13 | 7.30 | 7.47 |
| materials | NaOH |  | 0.037 | 0.042 | 0.046 | 0.050 |
| (kg) | PDCB |  | 7.40 | 8.08 | 8.27 | 8.47 |
|  | TCB |  | 0.0081 | 0.0090 | 0.0099 | 0.011 |
|  | Polymerization additive |  | 8.09 | 8.95 | 9.67 | 10.39 |

TABLE 11-continued

|  |  |  | | | | |
|---|---|---|---|---|---|---|
|  | NMP |  | 21.33 | 23.82 | 26.75 | 29.67 |
| Amount of resinous liquid formed (kg) |  |  | 78.86 | 78.85 | 78.86 | 78.85 |
| Withdrawal vessel K1 (High-molecular-weight polymer) | Amount Withdrawn (kg) |  | 35.41 | 39.58 | 43.53 | 47.55 |
|  | Withdrawal rate (%) |  | 44.9 | 50.2 | 55.2 | 60.3 |
|  | Polymer | Weight (kg) | 6.29 | 6.52 | 6.57 | 6.62 |
|  |  | Rate (%) | 85.5 | 88.7 | 89.3 | 90.0 |
|  |  | $[\eta]$ | 0.24 | 0.24 | 0.24 | 0.24 |
|  | Polymerization additive | Weight (kg) | 7.82 | 8.67 | 9.46 | 10.25 |
|  |  | Rate (%) | 48.0 | 53.2 | 58.0 | 62.9 |
|  | Solvent | Weight (kg) | 20.57 | 23.59 | 26.62 | 29.71 |
|  |  | Rate (%) | 38.4 | 44.0 | 49.7 | 55.4 |
|  | Amount withdrawn (kg) |  | 43.45 | 39.27 | 35.33 | 31.30 |
|  | Withdrawal rate (%) |  | 55.1 | 49.8 | 44.8 | 39.7 |
| Withdrawal vessel K2 (Low-molecular-weight polymer) | Polymer | Weight (kg) | 1.07 | 0.84 | 0.79 | 0.74 |
|  |  | Rate (%) | 14.5 | 11.3 | 10.7 | 10.0 |
|  |  | $[\eta]$ | 0.15 | 0.13 | 0.13 | 0.13 |
|  | Polymerization additive | Weight (kg) | 8.47 | 7.62 | 6.83 | 6.04 |
|  |  | Rate (%) | 52.0 | 46.8 | 42.0 | 37.1 |
|  | Solvent | Weight (kg) | 33.03 | 30.01 | 26.98 | 23.89 |
|  |  | Rate (%) | 61.0 | 56.0 | 50.3 | 44.6 |
| K1 + K2 | Total amount of polymer (kg) |  | 7.36 | 7.36 | 7.36 | 7.36 |
|  | Total amount of solvent (kg) |  | 53.6 | 53.6 | 53.6 | 53.6 |

|  |  |  | Example 14 | | | |
|---|---|---|---|---|---|---|
|  |  | Run No. | 62 | 63 | 64 | 65 |
|  | Withdrawal temperature (°C.) |  | 280 | 280 | | |
| Starting materials (kg) | Na$_2$S · 2.7H$_2$O |  | 6.13 | 6.39 | 6.65 | 6.88 |
|  | NaOH |  | 0.038 | 0.042 | 0.046 | 0.050 |
|  | PCDB |  | 6.96 | 7.25 | 7.53 | 7.79 |
|  | TCB |  | 0.0081 | 0.009 | 0.010 | 0.011 |
|  | Polymerization additive |  | 8.77 | 9.47 | 10.16 | 10.81 |
|  | NMP |  | 20.81 | 23.85 | 26.88 | 29.68 |
| Amount of resinous liquid formed (kg) |  |  | 78.87 | 78.87 | 78.87 | 78.87 |
| Withdrawal vessel K1 (High-molecular-weight polymer) | Amount Withdrawn (kg) |  | 35.34 | 39.51 | 43.46 | 47.24 |
|  | Withdrawal rate (%) |  | 44.8 | 50.1 | 55.1 | 59.9 |
|  | Polymer | Weight (kg) | 5.58 | 5.72 | 5.87 | 6.02 |
|  |  | Rate (%) | 75.9 | 77.8 | 79.8 | 81.7 |
|  |  | $[\eta]$ | 0.32 | 0.31 | 0.31 | 0.30 |
|  | Polymerization additive | Weight (kg) | 8.58 | 9.31 | 10.04 | 10.70 |
|  |  | Rate (%) | 52.6 | 57.2 | 61.6 | 65.9 |
|  | Solvent | Weight (kg) | 20.45 | 23.67 | 26.65 | 29.56 |
|  |  | Rate (%) | 38.2 | 44.2 | 49.7 | 55.1 |
|  | Amount withdrawn (kg) |  | 43.45 | 39.36 | 35.41 | 31.63 |
|  | Withdrawal rate (%) |  | 55.2 | 49.9 | 44.9 | 40.1 |
| Withdrawal vessel K2 (Low-molecular-weight polymer) | Polymer | Weight (kg) | 1.78 | 1.64 | 1.49 | 1.34 |
|  |  | Rate (%) | 24.1 | 22.2 | 20.2 | 18.3 |
|  |  | $[\eta]$ | 0.14 | 0.14 | 0.14 | 0.14 |
|  | Polymerization additive | Weight (kg) | 7.72 | 6.98 | 6.25 | 5.59 |
|  |  | Rate (%) | 47.4 | 42.8 | 38.4 | 34.3 |
|  | Solvent | Weight (kg) | 33.15 | 29.93 | 26.95 | 24.04 |
|  |  | Rate (%) | 61.8 | 55.8 | 50.3 | 44.9 |
| K1 + K2 | Total amount of polymer (kg) |  | 7.36 | 7.36 | 7.36 | 7.36 |
|  | Total amount of solvent (kg) |  | 53.6 | 53.6 | 53.6 | 53.6 |

EXAMPLE 15

Example 1 was repeated but changing the starting materials as shown in Table 12. The results obtained are shown in Table 12.

TABLE 12

|  |  |  | Example 15 | | |
|---|---|---|---|---|---|
|  |  | Run No. | 66 | 67 | 68 |
| Starting materials (kg) | Na$_2$S 2.7H$_2$O |  | 5.20 | 10.40 | 10.40 |
|  | NaOH |  | 0.034 | 0.068 | 0.068 |
|  | PDCB |  | 5.88 | 11.76 | 11.76 |
|  | TCB |  | 0.0072 | 0.014 | 0.014 |
|  | Kind of polymerization additive |  | Sodium benzoate | | Anhydrous sodium acetate |
|  | Amount of polymerization additive |  | 5.76 | 11.52 | 8.20 |
|  | NMP |  | 63.15 | 67.36 | 67.36 |
|  | Solvent/polymer ratio (wt.) |  | 15/1 | 8/1 | 8/1 |
|  | Amount of resinous liquid formed (kg) |  | 73.90 | 88.82 | 85.44 |
| Withdrawal vessel K1 (High-molecular-weight polymer) | Amount withdrawn (kg) |  | 26.84 | 32.70 | 32.24 |
|  | Withdrawal rate (%) |  | 36.3 | 36.8 | 37.7 |
|  | Polymer | Weight (kg) | 3.29 | 6.08 | 6.16 |

TABLE 12-continued

|  |  |  | Example 15 | | |
|---|---|---|---|---|---|
|  |  | Run No. | 66 | 67 | 68 |
|  |  | Rate (%) | 78.1 | 72.8 | 73.8 |
|  |  | [η] | 0.33 | 0.33 | 0.31 |
|  | Polymerization additive | Weight (kg) | 3.05 | 5.86 | 3.94 |
|  |  | Rate (%) | 32.0 | 29.9 | 32.0 |
|  | Solvent | Weight (kg) | 20.20 | 20.16 | 21.54 |
|  |  | Rate (%) | 32.0 | 29.9 | 32.0 |
| Withdrawal vessel K2 (Low-molecular-weight polymer) | Amount withdrawn (kg) |  | 47.06 | 56.12 | 53.20 |
|  | Withdrawal rate (%) |  | 63.7 | 63.2 | 62.3 |
|  | Polymer | Weight (kg) | 0.92 | 2.28 | 2.18 |
|  |  | Rate (%) | 21.9 | 27.2 | 26.2 |
|  |  | [η] | 0.16 | 0.13 | 0.12 |
|  | Polymerization additive | Weight (kg) | 2.71 | 5.66 | 4.26 |
|  |  | Rate (%) | 47.1 | 49.1 | 52.0 |
|  | Solvent | Weight (kg) | 42.95 | 47.20 | 45.82 |
|  |  | rate (%) | 68.0 | 70.1 | 68.0 |
| K1 + K2 | Total amount of polymer (kg) |  | 4.21 | 8.36 | 8.34 |
|  | Total amount of solvent (kg) |  | 63.15 | 67.36 | 67.36 |

EXAMPLE 16

In each of the runs, the starting materials shown in Table 13 were added severally to the low-molecular-weight polymers obtained in Example 15, which were contained in the withdrawal vessel K2. Thereafter, the reaction was carried out as in Example 15, and a high-molecular-weight polymer and a low-molecular-weight polymer were taken out into the withdrawal vessels K1 and K2, respectively, at the withdrawal rates shown in Table 13. The results thus obtained are shown in Table 13.

layer (I) containing a major amount of a polymer having a relatively high molecular weight and a minor amount of a polymer having a relatively low molecular weight and a layer (II) containing a major amount of a polymer having a relatively low molecular weight and a minor amount of a polymer having a relatively high molecular weight, withdrawing 30 to 70% by weight of the resin containing liquid composition from the top of the reaction vessel, and thereafter reacting the withdrawn resin after adding thereto a polyhaloaromatic compound and a sulfidizing agent and, as required, a polar amide solvent and a polymerization additive.

TABLE 13

|  |  |  | Example 16 | | |
|---|---|---|---|---|---|
|  |  | Run No. | 69 | 70 | 71 |
| Starting materials (kg) | $Na_2S \cdot 2.7H_2O$ |  | 4.06 | 9.24 | 7.68 |
|  | NaOH |  | 0.027 | 0.060 | 0.050 |
|  | PDCB |  | 4.59 | 10.4 | 8.68 |
|  | TCB |  | 0.0056 | 0.012 | 0.010 |
|  | Kind of polymerization additive |  | Sodium benzoate | | Anhydrous sodium acetate |
|  | Amount of polymerization additive |  | 3.05 | 5.86 | 3.94 |
|  | NMP |  | 20.2 | 20.16 | 21.54 |
| Amount of resinous liquid formed (kg) |  |  | 74.41 | 89.13 | 85.82 |
| Withdrawal vessel K1 (High-molecular-weight polymer) | Amount withdraw (kg) |  | 26.42 | 32.36 | 31.31 |
|  | Withdrawal rate (%) |  | 35.5 | 36.3 | 36.5 |
|  | Polymer | Weight (kg) | 3.45 | 6.57 | 6.60 |
|  |  | Rate (%) | 82.1 | 78.6 | 78.9 |
|  |  | [η] | 0.34 | 0.34 | 0.32 |
|  | Polymerization additive | Weight (kg) | 2.90 | 5.63 | 3.80 |
|  |  | Rate (%) | 50.4 | 48.9 | 46.4 |
|  | Solvent | Weight (kg) | 19.58 | 19.47 | 20.21 |
|  |  | Rate (%) | 31.0 | 28.9 | 30.0 |
| Withdrawal vessel K2 (Low-molecular-weight polymer) | Amount withdrawn (kg) |  | 47.99 | 56.77 | 54.51 |
|  | Withdrawal rate (%) |  | 64.5 | 63.7 | 63.5 |
|  | Polymer | Weight (kg) | 0.75 | 1.78 | 1.76 |
|  |  | Rate (%) | 17.9 | 21.4 | 21.1 |
|  |  | [η] | 0.16 | 0.14 | 0.13 |
|  | Polymerization additive | Weight (kg) | 2.86 | 5.89 | 4.40 |
|  |  | Rate (%) | 49.6 | 51.1 | 53.6 |
|  | Solvent | Weight (kg) | 43.57 | 47.89 | 47.15 |
|  |  | Rate (%) | 69.0 | 71.1 | 70.0 |
| K1 + K2 | Total amount of polymer (kg) |  | 4.21 | 8.36 | 8.36 |
|  | Total amount of solvent (kg) |  | 63.15 | 67.36 | 67.36 |

What is claimed is:

1. A process for producing a high-molecular-weight arylene sulfide polymer, which comprises reacting within a reaction vessel a polyhaloaromatic compound and a sulfidizing agent in a polar amide solvent in the presence of at least one polymerization additive to form a resin containing liquid composition consisting of a 2. The process of claim 1 wherein the inherent viscosity (η) of the polymer contained in the layer (II) is 0.05 to 0.20, said inherent viscosity (η) being calculated by the equation $$(\eta) = \frac{\ln(\text{relative viscosity})}{\text{polymer concentration}}$$

wherein the relative viscosity being measured with an alpha-chloronaphthalene solution of the polymer of a concentration of 0.4 g/100 ml at 206° C.

3. The process of claim 1 wherein the polyhaloaromatic compound is added to the withdrawn resin in an amount of 20 to 3000 parts by weight per 100 parts by weight of polymer contained in said withdrawn resin.

4. The process of claim 1 wherein the sulfidizing agent to be added to the withdrawn resin is added such that the sulfur amounts to 0.8 to 1.2 equivalents per 2 equivalents of the halogen of the polyhaloaromatic compound.

5. The process of claim 4 wherein the polyhaloaromatic compound is added to the withdrawn resin in an amount of 20 to 3000 parts by weight per 100 parts by weight of polymer contained in said withdrawn resin.

6. The process of claim 1 wherein the resin containing liquid composition formed contains the polar amide solvent and the resulting polymer in a ratio of 20/1 to 1/2 by weight and wherein the reaction temperature is 200 to 330° C. and the reaction pressure is 1.1 to 200 kg/cm².

7. The process of claim 1 wherein the ratio of the polymerization additive to the polar amide solvent is in the range of from 2/1 to 1/30 by weight.

8. The process of claim 7 wherein the resin containing liquid composition formed contains the polar amide solvent and the resulting polymer in a ratio of 20/1 to 1/1 by weight.

* * * * *